(12) United States Patent
Tang et al.

(10) Patent No.: US 7,826,166 B2
(45) Date of Patent: Nov. 2, 2010

(54) DATA PATTERN FOR FLY HEIGHT MEASUREMENT

(75) Inventors: Yawshing Tang, Saratoga, CA (US); Peng Luo, Fremont, CA (US); Na-Young Kim, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 264 days.

(21) Appl. No.: 12/215,441

(22) Filed: Jun. 27, 2008

(65) Prior Publication Data
US 2009/0323211 A1 Dec. 31, 2009

(51) Int. Cl.
G11B 21/02 (2006.01)
G11B 27/36 (2006.01)
(52) U.S. Cl. .......................................... 360/75; 360/31
(58) Field of Classification Search .................. None
See application file for complete search history.

(56) References Cited

U.S. PATENT DOCUMENTS

| 5,130,866 | A | 7/1992 | Klaassen et al. |
| 7,199,961 | B1* | 4/2007 | Wu et al. ....................... 360/75 |
| 7,342,736 | B1* | 3/2008 | Turner et al. ................... 360/75 |
| 7,715,135 | B1* | 5/2010 | Sutardja et al. ................ 360/40 |

* cited by examiner

*Primary Examiner*—Daniell L Negrón
*Assistant Examiner*—Regina N Holder
(74) *Attorney, Agent, or Firm*—Ben J. Yorks; Irell & Manella LLP

(57) ABSTRACT

A hard disk drive that includes a disk and a head that is separated from the disk by a flying height. The disk drive also includes a circuit that determines the flying height from an equation that uses a third harmonic of a read signal. The read signal includes a data pattern that is a product of a first data pattern and a second data pattern. The resultant data pattern provides a third harmonic with a relatively high magnitude and improved signal to noise ratio.

18 Claims, 3 Drawing Sheets

DATA PATTERN FOR FLY HEIGHT MEASUREMENT

BACKGROUND OF THE INVENTION

1. Field of the Invention

The present invention relates to a method for determining the flying height of a head of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

HGA transducers include three primary elements: a read sensor, a write element and a head protrusion control element, also known as fly-on-demand ("FOD"). The read sensor is commonly made of an magneto-resistive structure. The write element includes a coil and a magnetic flux path structure made with high permeability and high magnetization material. The head protrusion control element (FOD device) includes a heater coil. When a current is applied, the coil generates heat and causes the write and read elements to move closer to the media.

During operation, each head is separated from a corresponding disk surface by an air bearing. The air bearing eliminates mechanical interference between the head and the disks. The FOD device is used to further set read and write positions above the disk surface, based on a pre-calibrated target. The strength of the magnetic field from the disk is inversely proportional to the height of the read head spacing to the disk. Reduced spacing results in a stronger magnetic field on the disk, and vice versa.

The flying height of a head may vary during the operation of the drive. For example, a shock load on the drive may create a vibration that causes the heads to mechanically resonate. The vibration causes the heads to move toward and then away from the disk surfaces in an oscillating manner. Particles or scratch ridges in the disk may also cause oscillating movement of the heads. The oscillating movement may occur in either a vertical or in-plane direction relative to the flexure arm. Environment changes, such as temperature and altitude can also cause a change in the head flying height.

If oscillation of the heads occurs during a write routine of the drive, the resultant magnetic field from the writer on the disk will vary inversely relative to the flying height of the writer. The varying magnetic field strength may result in poor writing of data. Errors may occur when the signal is read back by the drive.

Knowing and controlling the flying heights of the heads is critical for both disk drive reliability and data integrity. To accurately operate the FOD device and achieve the desirable write and read spacings to the disk, flying height measurement techniques have been developed. The most common technique is to use playback signal components in frequency domain.

There are various methods for controlling the flying height through feedback schemes. For example, the flying height can be controlled by analyzing the 1st and 3rd harmonics from square wave read signals in perpendicular recording, or periodic isolated pulses in longitudinal recording. The third harmonic signals tend be relatively weak and have a poor signal to noise ratio. The low signal to noise ratio can degrade the accuracy of the flying height measurement.

BRIEF SUMMARY OF THE INVENTION

A hard disk drive that includes a disk and a head that is separated from the disk by a flying height. The disk drive also includes a circuit that determines the flying height from an equation that uses a third harmonic of a read signal. The read signal includes a data pattern that is a product of a first data pattern and a second data pattern.

DETAILED DESCRIPTION

Disclosed is a hard disk drive that includes a disk and a head that is separated from the disk by a flying height. The disk drive also includes a circuit that determines the flying height from an equation that uses a third harmonic of a read signal. The read signal includes a data pattern that is a product of a first data pattern and a second data pattern. The resultant data pattern provides a third harmonic with a relatively high magnitude and improved signal to noise ratio.

Figure 1:
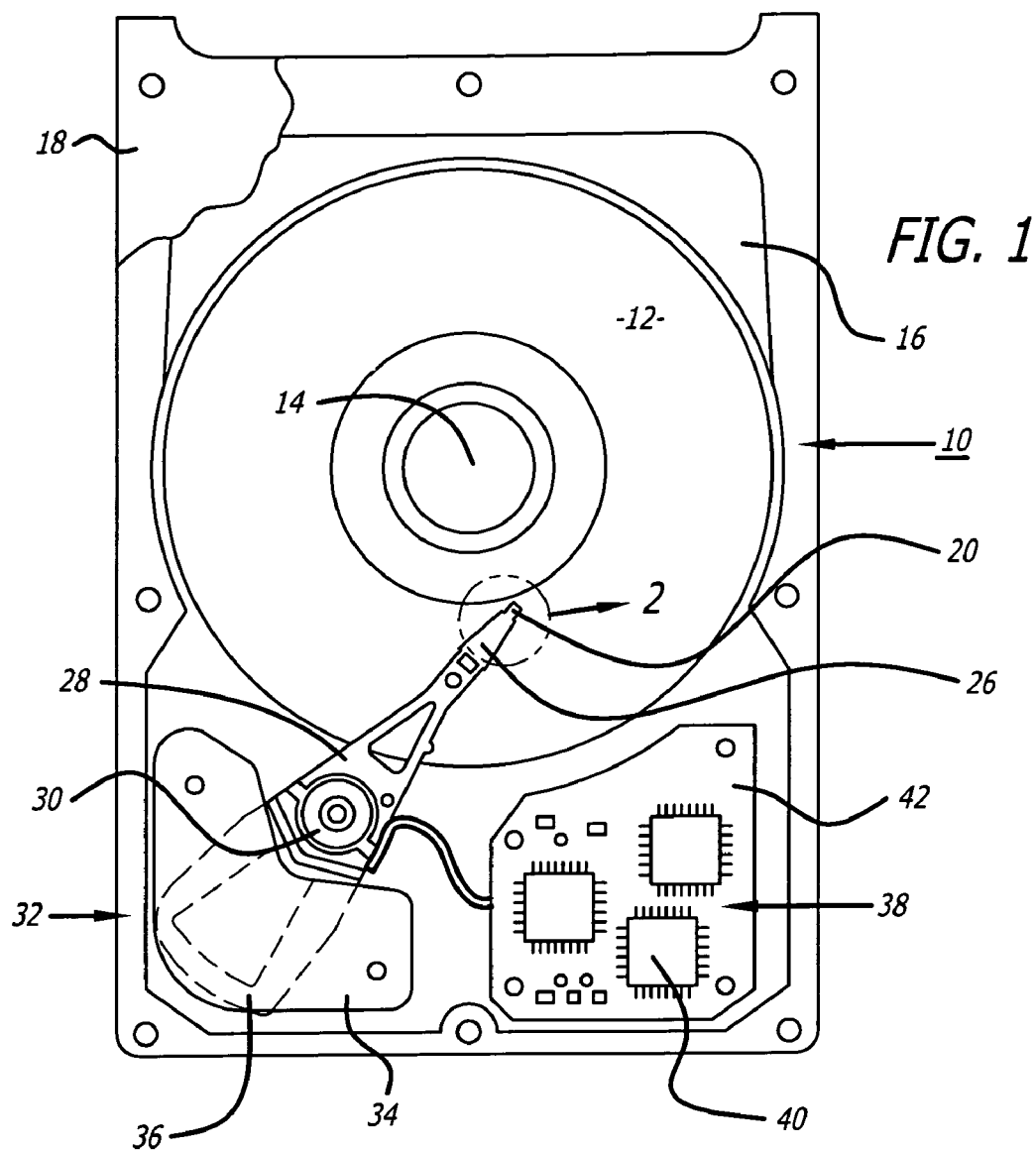
FIG. 1 is a top view of an embodiment of a hard disk drive.

Referring to the drawings more particularly by reference numbers, FIG. 1 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 2:
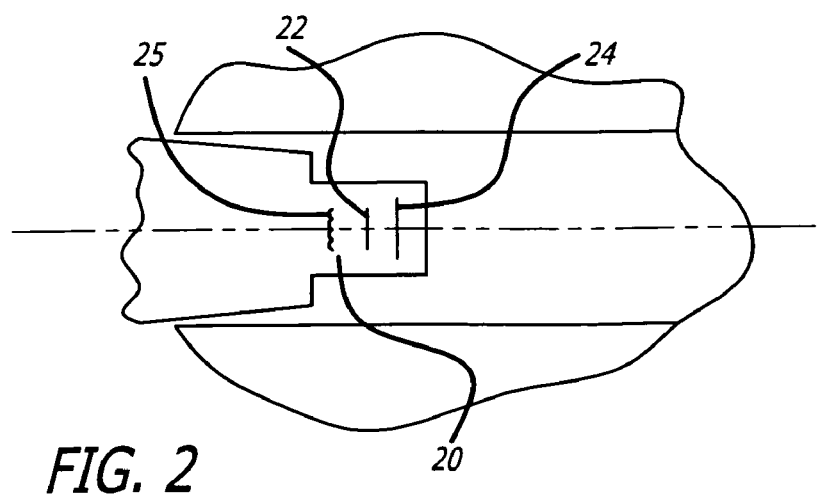
FIG. 2 is a top enlarged view of a head of the hard disk drive.

The disk drive 10 may include a plurality of heads 20 located adjacent to the disks 12. As shown in FIG. 2 the heads 20 may have separate write 24 and read elements 22. The write element 24 magnetizes the disk 12 to write data. The read element 22 senses the magnetic fields of the disks 12 to read data. By way of example, the read element 22 may be constructed from a magneto-resistive material that has a resistance which varies linearly with changes in magnetic flux. The heads also contain a heater coil 25. Current can be provided to the heater coil 25 to generate heat within the head 20. The heat thermally expands the head 20 and moves the read and write elements closer to the disk.

Referring to FIG. 1, each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes one or more integrated circuits 40 coupled to a printed circuit board 42. The printed circuit board 40 is coupled to the voice coil 32, heads 20 and spindle motor 14 by wires (not shown).

Figure 3:
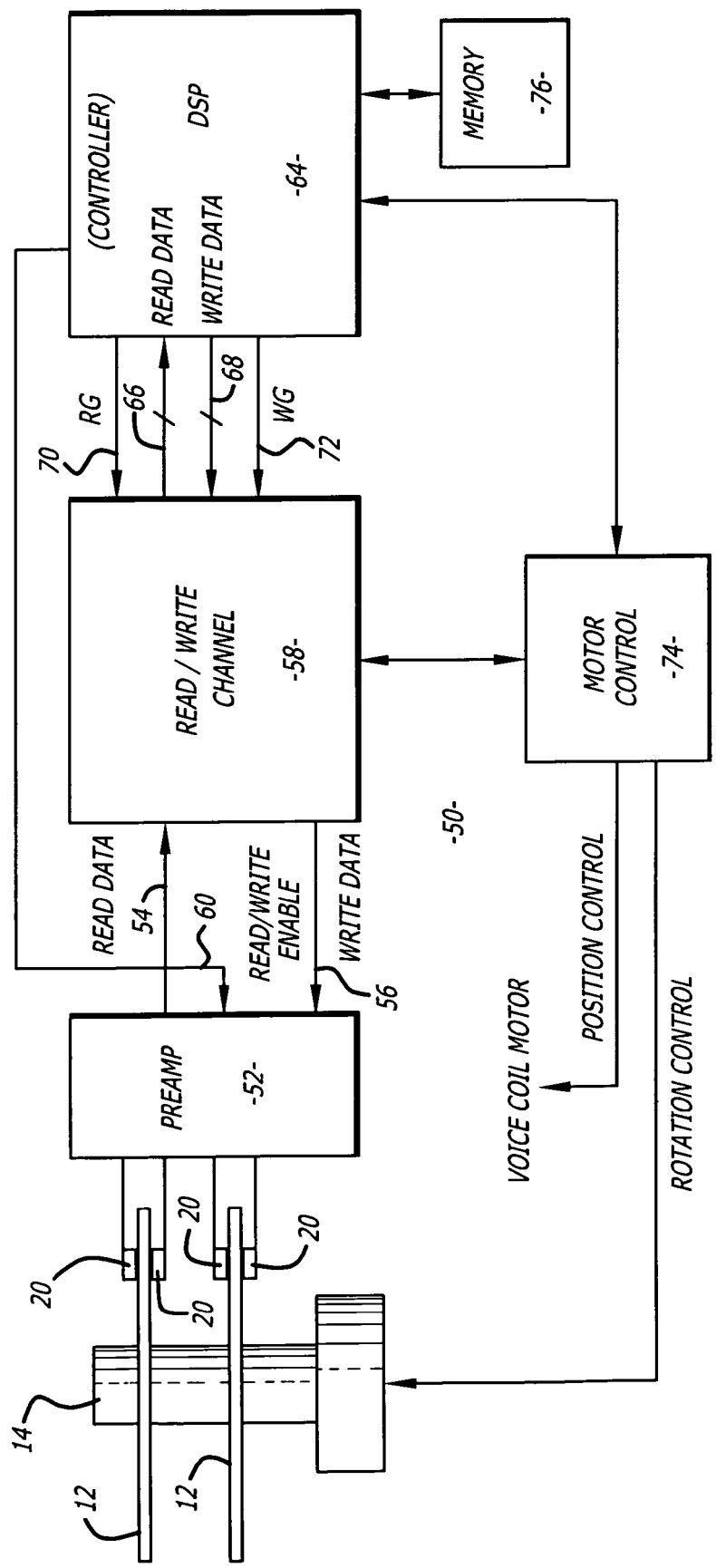
FIG. 3 is a schematic of an electrical circuit for the hard disk drive.

FIG. 3 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM"). The non-volatile memory 76 may contain the instructions to operate the controller and disk drive. Alternatively, the controller may have embedded firmware to operate the drive.

The heads 20 and read channel circuit 58 generate a read signal from the disk. The read signal is used to determine a flying height of a head. Preferably a Wallace equation is applied to the first and third harmonics of the read signal to determine the flying height. To improve the magnitude and signal to noise ratio of the third harmonic, the data pattern of the read signal is a product of a first data pattern multiplied by a second data pattern.

By way of example, the clock rate of the read signal may be F. The read signal may be a square wave generated from a perpendicular recording head. A square wave of frequency ½ F is multiplied with a frequency of ⅛ F. The resultant square wave will contain odd harmonics such as ⅛ F and ⅜ F.

Figure 4:
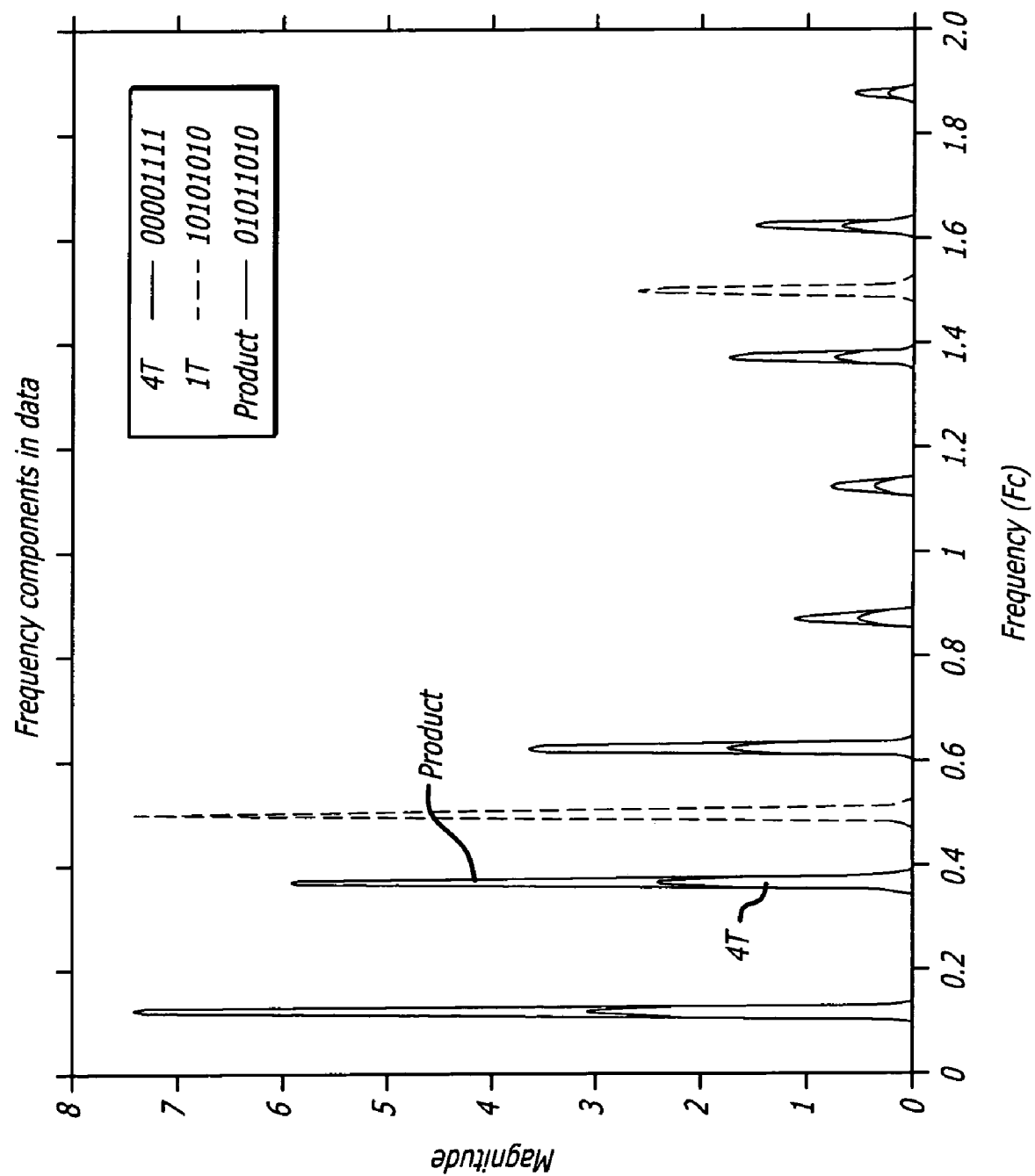
FIG. 4 is a graph showing frequency components of a data pattern.

The first data pattern may be a 1T pattern such as 101010 10 . . . . The second data pattern may be a 4T pattern such as 0000111100001111 . . . . When multiplying the patterns the 0's can be treated as a −1, so that 1 times −1 is −1, but −1 times −1 is equal to 1. For example, multiplication of the 1T pattern by the 4T pattern produces a pattern of 0101101001011010. FIG. 4 shows the frequency components of the data pattern that is the product of the 1T and 4T patterns compared with the frequency components of a 1T pattern by itself and a 4T pattern by itself. As can be seen the third harmonic of the data pattern that is a product of the two data patterns has a higher third harmonic magnitude than the 4T data patterns by itself.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
   a disk;
   a spindle motor that rotates said disk;
   a head coupled to said disk and separated from said disk by a flying height; and,
   a circuit coupled to said head, said circuit determines said flying height from an equation that uses a third harmonic of a read signal, said read signal includes a data pattern that is a product of a first data pattern and a second data pattern, said first and second data patterns having a different sequence of ones and zeros.

2. The disk drive of claim 1, wherein said first data pattern is a 1T pattern and said second data pattern is a 4T pattern.

3. The disk drive of claim 1, wherein said read signal is generated at a clock rate of F and said third harmonic has a frequency of ⅜ F.

4. The disk drive of claim 3, wherein said first data pattern has a frequency of ½ F and said second data pattern has a frequency of ⅛ F.

5. The disk drive of claim 1, wherein said equation uses a first harmonic of said read signal.

6. The disk drive of claim 1, wherein said read signal is a square wave.

7. A hard disk drive, comprising:
   a disk;
   a spindle motor that rotates said disk;
   a head coupled to said disk and separated from said disk by a flying height; and,
   circuit means for determining said flying height from an equation that uses a third harmonic of a read signal, said read signal includes a data pattern that is a product of a first data pattern and a second data pattern, said first and second data patterns having a different sequence of ones and zeros.

8. The disk drive of claim 7, wherein said first data pattern is a 1T pattern and said second data pattern is a 4T pattern.

9. The disk drive of claim 7, wherein said read signal is generated at a clock rate of F and said third harmonic has a frequency of ⅜ F.

10. The disk drive of claim 9, wherein said first data pattern has a frequency of ½ F and said second data pattern has a frequency of ⅛ F.

11. The disk drive of claim 7, wherein said equation uses a first harmonic of said read signal.

12. The disk drive of claim 7, wherein said read signal is a square wave.

13. A method for determining a flying height of a head of a hard disk drive, comprising:
   generating a read signal with a data pattern that is a product of a first data pattern and a second data pattern, said first and second data patterns having a different sequence of ones and zeros; and,
   determining a flying height of a head with an equation that uses a third harmonic of the read signal.

14. The method of claim 13, wherein the first data pattern is a 1T pattern and the second data pattern is a 4T pattern.

15. The method of claim 13, wherein the read signal is generated at a clock rate of F and the third harmonic has a frequency of ⅜ F.

16. The method of claim 15, wherein the first data pattern has a frequency of ½ F and the second data pattern has a frequency of ⅛ F.

17. The method of claim 13, wherein the equation uses a first harmonic of the read signal.

18. The method of claim 13, wherein the read signal is a square wave.

* * * * *